United States Patent
Lee et al.

(10) Patent No.: US 9,683,069 B2
(45) Date of Patent: Jun. 20, 2017

(54) METHOD FOR PREPARING WEATHER RESISTANT REINFORCED ACRYLATE BASED RESIN

(71) Applicant: LG Chem, LTD., Seoul (KR)

(72) Inventors: Roo Da Lee, Daejeon (KR); Sang Hoo Park, Daejeon (KR); Won Seok Lee, Daejeon (KR); Seok Goo Jang, Daejeon (KR); Jeong Su Choi, Daejeon (KR); Jeun Hoon Yoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/773,245

(22) PCT Filed: Aug. 29, 2014

(86) PCT No.: PCT/KR2014/008051
§ 371 (c)(1),
(2) Date: Sep. 4, 2015

(87) PCT Pub. No.: WO2015/034209
PCT Pub. Date: Mar. 12, 2015

(65) Prior Publication Data
US 2016/0297915 A1    Oct. 13, 2016

(30) Foreign Application Priority Data
Sep. 4, 2013 (KR) .......................... 10-2013-0106073
Aug. 28, 2014 (KR) .......................... 10-2014-0112883

(51) Int. Cl.
C08L 51/04 (2006.01)
C08F 285/00 (2006.01)
C08L 51/00 (2006.01)

(52) U.S. Cl.
CPC .......... *C08F 285/00* (2013.01); *C08L 51/003* (2013.01); *C08L 51/04* (2013.01)

(58) Field of Classification Search
None
See application file for complete search history.

(56) References Cited

U.S. PATENT DOCUMENTS

| | | | | |
|---|---|---|---|---|
| 4,788,253 A * | 11/1988 | Hambrecht | ............. | C08L 25/08 525/82 |
| 2002/0065381 A1 | 5/2002 | Lorah et al. | | |
| 2002/0068791 A1 | 6/2002 | Brown et al. | | |
| 2005/0059769 A1* | 3/2005 | Chou | ..................... | B82Y 30/00 524/445 |
| 2015/0107762 A1* | 4/2015 | Nair | ....................... | C09J 133/08 156/247 |

FOREIGN PATENT DOCUMENTS

| | | |
|---|---|---|
| CN | 1348963 A | 5/2002 |
| JP | 4340421 B2 | 10/2009 |
| KR | 10-2002-0003484 A | 1/2002 |
| KR | 10-2004-0067424 A | 7/2004 |
| KR | 10-2012-0009860 A | 2/2012 |

OTHER PUBLICATIONS

International search report for PCT/KR2014/008051 filed on Aug. 29, 2014.
Office Action from Chinese Patent Office for Application No. 201480010994.3, dated Aug. 8, 2016.

* cited by examiner

*Primary Examiner* — Jeffrey Mullis

(57) ABSTRACT

The present invention relates to a method for preparing a weather resistant reinforced acrylate based resin. More specifically, an activator-free conversion rate improver is included in an acrylate-styrene based graft copolymer, thereby improving the haze value, light transmittance, and yellow index when mixed with an acrylate-styrene based non-graft copolymer, and securing the weather resistance. In particular, according to the present invention, a weather resistant reinforced thermoplastic resin having excellent colors which are close to natural colors can be provided even without using sodium formaldehyde sulfoxylate (SFS) and iron ions.

17 Claims, No Drawings

METHOD FOR PREPARING WEATHER
RESISTANT REINFORCED ACRYLATE
BASED RESIN

CROSS REFERENCE TO RELATED APPLICATIONS

The present application is a U.S. National Stage of International Patent Application No. PCT/KR2014/008051 filed Aug. 29, 2014, which claims priority to Korean application number KR 10-2013-0106073, filed on Sep. 4, 2013, and Korean application number KR 10-2014-0112883, filed on Aug. 28, 2014, which are incorporated by reference in their entirety.

TECHNICAL FIELD

The present invention relates to a method for preparing a weather-resistant acrylate resin, and more particularly, to a method of preparing an acrylate resin using a specific acrylate resin composition as a starting material, in which an activator-free conversion improver is incorporated into an acrylate-styrene graft copolymer so that the haze value, light transmittance and yellow index of a composition obtained by mixing the acrylate-styrene graft copolymer with an acrylate-styrene non-graft copolymer can be improved and the weather resistance thereof can also be ensured.

BACKGROUND ART

Generally, acrylonitrile-butadiene-styrene (ABS) resin is used in various applications, comprising vehicle parts, electric home appliances, and office automation (OA) devices such as printers or scanners, because it has a good balance of processability of styrene, toughness and chemical resistance of acrylonitrile and impact resistance of butadiene, and has an excellent appearance.

However, ABS resin has a shortcoming in that it is opaque, and thus use thereof in parts requiring transparency, such as a transparent window for a microwave oven, a cleaner duct, a housing for a TV, a housing for a game console, and a transparent window for office equipment is limited. Due to this shortcoming, transparent materials have recently been actively developed.

Transparent resins that are used mainly in products requiring transparency comprise styrene-acrylonitrile resin, polycarbonate, general purpose polystyrene (GPPS), polymethylmethacrylate and transparent ABS resin. Among these resins, thermoplastic transparent resins such as transparent ABS have high impact strength and processability compared to other resins, and thus have recently been actively studied.

However, transparent ABS resin has poor weather resistance due to the characteristics of butadiene rubber used as an impact modifier in the transparent ABS resin, and thus use thereof has been limited.

In addition, transparent resins containing butadiene rubber also have limited transparency. Specifically, when the rubber content of these transparent resins is as low as 5% or less, the resins have excellent transparency, but when the rubber content of the resins is more than 5%, the resins have poor transparency, and thus have a haze value higher than that of polycarbonate (PC) or polymethylmethacrylate (PMMA).

Furthermore, these resins have a poor color, and for this reason, the color thereof is adjusted using a colorant during an extrusion or injection molding process. Nevertheless, these resins do not have a color close to natural color, and thus use thereof is limited.

Meanwhile, to achieve a high degree of conversion at low reaction temperature, a redox system is mainly used during polymerization. To form the redox system, the following three methods are typically used: a method of adding a colloidal dispersion of $Fe^{2+}$; a method of adding reducing sugar (fructose, etc.); and a method of using sodium formaldehyde sulfoxylate (SFS).

Among these methods, sodium formaldehyde sulfoxylate (SFS) is mainly used, because it enables reduction in the amount of iron (Fe) ions compared to other systems.

For reference, if Fe ions remain in a product, they will discolor the product and reduce the thermal stability of the product. If Fe ions are not used during polymerization for this reason, the degree of conversion will be significantly reduced, and thus the yield of the product will be reduced and the content of residual monomers in the product will also increase, adversely affecting the physical properties of the product.

Meanwhile, if sodium formaldehyde sulfoxylate (SFS) is used, there will be a shortcoming in that, because sodium formaldehyde sulfoxylate (SFS) is sodium sulfinate and formaldehyde, environmentally harmful formaldehyde will be emitted during post-treatment of the product.

Accordingly, there is a need for a technology which enables a resin product to have a good color close to natural color and to ensure weather resistance, without having to use sodium formaldehyde sulfoxylate (SFS) and Fe ions.

DISCLOSURE

Technical Problem

Therefore, the present invention has been made in view of the above-described problems occurring in the prior art, and it is one object of the present invention to provide a method of preparing a thermoplastic resin product, which has a good color close to natural color and ensures weather resistance, without having to use sodium formaldehyde sulfoxylate (SFS) and Fe ions.

Technical Solution

In accordance with one aspect of the present invention, provided is a method of preparing a weather-resistant thermoplastic resin using an acrylate resin composition as a starting material, wherein the acrylate resin composition comprises an acrylate-styrene graft copolymer and an acrylate-styrene non-graft copolymer, wherein the acrylate-styrene graft copolymer is polymerized comprising an acrylate rubber latex, a (meth)acrylic acid alkyl ester compound, an aromatic vinyl compound, and an activator-free conversion improver.

In accordance with another aspect of the present invention, provided is a weather-resistant acrylate resin which is prepared by the above method and has a light transmittance of 92% or higher as measured a 3 mm thick sheet in accordance with ASTM D1003, a haze value of 1.2% or lower as measured on a 3 mm thick sheet in accordance with ASTM D1003, a yellow index (YI) of 0.89 or less as measured using a Color Quest II, a thermal stability ($^\Delta E$) of 0.36 or less, and a weather resistance ($^\Delta E$) of 2.1 or less.

Advantageous Effects

As apparent from the foregoing, the present invention advantageously provides an acrylate resin composition and a weather-resistant acrylate resin. Specifically, according to the present invention, an activator-free conversion improver is incorporated into an acrylate-styrene graft copolymer so that the haze value, light transmittance and yellow index of a composition obtained by mixing the acrylate-styrene graft copolymer with a acrylate-styrene non-graft copolymer can be improved and the weather resistance thereof can also be ensured. In particular, the present invention can provide a thermoplastic resin having a good color close to natural color, without having to use sodium formaldehyde sulfoxylate (SFS) and Fe ions.

BEST MODE

Hereinafter, the present invention will be described in detail.

The present invention provides a method for preparing an acrylate resin, which comprises preparing a weather-resistant acrylate resin using a specific acrylate resin composition as a starting material.

In an embodiment, the acrylate resin composition may comprise an acrylate-styrene graft copolymer and an acrylate-styrene non-graft copolymer, wherein the acrylate-styrene graft copolymer may comprise an acrylate rubber latex, a (meth)acrylic acid alkyl ester compound, and an activator-free conversion improver.

As used herein, the term "activator-free conversion improver", unless otherwise specified, refers to an additive that contains no activator and is capable of improving conversion.

Particularly, the present invention is technically characterized in that the use of Fe ions among activators is excluded.

As used herein, the term "acrylate-styrene non-graft copolymer", unless otherwise specified, refers to a copolymer that is not prepared by graft emulsion polymerization, but is prepared by bulk polymerization, solution polymerization or suspension polymerization.

In an embodiment, the activator-free conversion improver may be one or more selected from among 2-hydroxy-2-sulfinatoacetic acid, disodium 2-hydroxy-2-sulfinatoacetate, and 2-hydroxy-2-sulfinatoacetate.

The activator-free conversion improver may be used in an amount of 0.01-0.5 parts by weight or 0.01-0.3 parts by weight based on 100 parts by weight of the sum of the latex and compounds of the acrylate-styrene graft copolymer.

If the amount of activator-free conversion improver used is less than 0.01 parts by weight, the degree of conversion will be reduced and the content of residual monomers in the product will increase, and if the amount of activator-free conversion improver used is more than 0.5 parts by weight, haze of the product will undesirably increase.

For example, when disodium 2-hydroxy-2-sulfinatoacetate is used, there will be an advantage in that, because it is decomposed into sulfinate and sodium glyoxalate, emission of formaldehyde due to use of sodium dodecyl sulfonate (SFS) is avoided.

In an embodiment, the acrylate resin composition may comprise 10-90 wt % of the acrylate-styrene graft copolymer and 90-10 wt % of the acrylate-styrene non-graft copolymer.

If the acrylate-styrene graft copolymer is used in an amount of less than 10 wt %, the impact strength of the composition will be significantly reduced, and if the acrylate-styrene graft copolymer is used in an amount of more than 90 wt %, the resin will have poor processability due to its poor flowability while the colorability and processability of the resin will be reduced.

In a specific embodiment, the acrylate resin composition may comprise 10-60 wt % of the acrylate-styrene graft copolymer and 90-40 wt % of the acrylate-styrene non-graft copolymer.

In another embodiment, the acrylate resin composition may comprise 20-40 wt % of the acrylate-styrene graft copolymer and 80-60 wt % of the acrylate-styrene non-graft copolymer.

The acrylate rubber latex that is one component of the acrylate-styrene graft copolymer may have a gel content of, for example, 60-90% or 70-88%.

The acrylate rubber latex may have a mean particle diameter of, for example, 100-800 nm or 150-300 nm, as measured using a submicron particle sizer (Nicomp 380, PPS (Particle Sizing Systems)).

The mean particle diameter of the rubber latex is a factor that has a very great effect on the impact strength and processability of the final resin. A rubber latex having a mean particle size of less than 100 nm will be difficult to prepare and can also have reduced efficiency, and a rubber latex having a mean particle size of more than 800 nm can increase the haze of the resin. In addition, when a conjugated diene rubber latex having a mean particle diameter of 150-300 nm is used, the color and impact strength of the resin can be improved.

In an embodiment, the graft copolymer may comprise, in addition to 5-50 parts by weight of the acrylate rubber latex, a (meth)acrylic acid alkyl ester compound, and an aromatic vinyl compound, and optionally a vinyl cyan compound. If the vinyl cyan compound is used in an amount of more than 5 parts by weight based on the latex and compounds of the graft copolymer, it will cause yellowing that adversely affects the color of the final product.

Particularly, the present invention is technically characterized in that the resin of the present invention has transparency (haze level) comparable to that of polycarbonate (PC) or PMMA while having an increased content of rubber, and exhibits a color close to natural color, without having to use a separate colorant. If the rubber latex is used in an amount of less than 5 parts by weight, the acrylate resin will be brittle due to its low impact resistance, and if it is used in an amount of more than 50 parts by weight, the acrylate resin will be difficult to process and will have poor transparency.

If the (meth)acrylic acid alkyl ester compound is used in an amount of less than 20 parts by weight or more than 75 parts by weight based on 100 parts by weight of the sum of the latex and compounds of the graft copolymer, there will be a difference in refractive index between the graft copolymer and the non-graft copolymer, resulting in an increase in haze.

The aromatic vinyl compound is preferably used in an amount of 10-50 parts by weight based on 100 parts by weight of the sum of the latex and compounds of the graft copolymer. If the aromatic vinyl compound is used in an amount of less than 10 parts by weight, the viscosity of the reactants will be high and the processability and flowability of the produced product will be poor, and if the aromatic vinyl compound is used an amount of more than 50 parts by weight, the refractive index of the product will increase, resulting in a decrease in transparency.

In a specific embodiment, the graft copolymer may comprise 11-50 parts by weight of the acrylate rubber latex, 20-35 parts by weight of the (meth)acrylic acid alkyl ester compound, 6-14 parts by weight of the aromatic vinyl compound, and 1-4 parts by weight of the vinyl cyan compound.

In an embodiment, the graft copolymer may comprise an emulsifier in an amount of 0.1-5 parts by weight based on 100 parts by weight of the sum of the latex and compounds of the graft copolymer. If the emulsifier is used in an amount of less than 0.1 parts by weight, the emulsion stability of the copolymer will be reduced, and if it is used in an amount of more than 5.0 parts by weight, the content of residual emulsifier will increase, adversely affecting the physical properties (such as haze) of the resin.

In an embodiment, the emulsifier may be one or a mixture of two or more selected from the group consisting of reactive emulsifiers, comprising sulfoethyl methacrylate, 2-acrylamido-2-methylpropane sulfonic acid, sodium styrene sulfonate, sodium dodecyl allyl sulfosuccinate, a styrene-sodium dodecyl allyl sulfosuccinate copolymer, polyoxyethylene alkyl phenyl ether ammonium sulfate, alkenyl $C_{16-18}$ succinic acid di-potassium salt, and sodium methallyl sulfonate, and/or non-reactive emulsifiers, comprising alkyl aryl sulfonate, alkali methyl alkyl sulfate, sulfonated alkyl ester, soap of fatty acid, and an alkali salt of rosin acid.

In an embodiment, the graft polymer may comprise one or more oil-soluble initiators selected from among diisopropylbenzene hydroperoxide, t-hexyl hydroperoxide, 1,1,3,3-tetramethylbutyl hydroperoxide, dicumyl peroxide, t-butylcumyl peroxide, methyl ethyl ketone peroxide, methyl isobutyl ketone peroxide, cyclohexanone peroxide, cumene hydroperoxide, t-butyl hydroperoxide, benzoyl peroxide, lauroyl peroxide, 1,1-di(t-butylperoxy)cyclohexane, 1,1-di(t-butylperoxy)3,3,5-trimethylcyclohexane, t-butylperoxy benzoate, t-butylperoxy 2-ethyl hexanoate, and bis(4-t-butylcyclohexyl)peroxydicarbonate, in an amount of 0.1-5 parts by weight based on 100 parts by weight of the sum of the latex and compounds of the graft copolymer.

Particularly, the present invention is technically characterized in that it does not use one or more activators selected from the group consisting of sodium formaldehyde sulfoxylate, sodium ethylenediamine tetraacetate, ferrous sulfate, dextrose, sodium picolinate, and sodium sulfite, which have generally been used in combination with the oil-soluble initiators. Specifically, 2-hydroxy-2-sulfinatoacetic acid or an alkali metal salt thereof may be used as a substitute for the activator.

In an embodiment, each of the graft copolymer and the non-graft copolymer may comprise a mercaptan molecular weight regulator in an amount of 0.1-5 parts by weight based on 100 parts by weight of the sum of the latex and compounds of the graft copolymer.

Furthermore, the graft copolymer may comprise 0.05-5 parts by weight of at least one compound represented by the following formula 1:

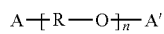

Formula 1 wherein A is a substituent having a vinyl group, or (meth)acrylate; A' is hydrogen, a $C_{1-20}$ alkyl group, a $C_{5-24}$ arylalkyl group, a $C_{5-24}$ arylamine group, or a $C_{6-30}$ aryl group; R is ethyl or propyl; and N is an integer ranging from 5 to 15.

Specifically, the compound represented by formula 1 may be one or more selected from the group consisting of divinylbenzene, ethylene glycol dimethacrylate, diethyleneglycol dimethacrylate, triethylene glycol dimethacrylate, 1,3-butyleneglycol dimethacrylate, aryl methacrylate and 1,3-butyleneglycol diacrylate.

In an embodiment of the present invention, the acrylate-styrene non-graft copolymer may be a bulk polymer, a solution polymer or a suspension polymer, which comprises 20-75 parts by weight of the (meth)acrylic acid alkyl ester compound, 10-50 parts by weight of the aromatic vinyl compound, and 0-10 parts by weight of the vinyl cyan compound.

In an embodiment, the (meth)acrylic acid alkyl ester compound may be one or more selected from among (meth)acrylic acid methyl ester, (meth)acrylic acid ethyl ester, (meth)acrylic acid propyl ester, (meth)acrylic acid 2-ethylhexyl ester, (meth)acrylic acid decyl ester, and (meth)acrylic acid lauryl ester.

In an embodiment, the aromatic vinyl compound may be one or more selected from among styrene, α-methyl styrene, p-methyl styrene, and vinyl toluene.

In an embodiment, the vinyl cyan compound may be one or more selected from among acrylonitrile, methacrylonitrile and ethacrylonitrile.

The acrylate resin composition may further comprise one or more additives selected from among a lubricant, an antioxidant, an antistatic agent, a release agent and a UV stabilizer, depending on the intended use thereof.

Among the additives, the lubricant may be selected from among ethylene bis stearamide, polyethylene oxide wax, metal stearate, and various silicone oils, and may be used in an amount of 0-5 parts by weight, preferably 0.1-2 parts by weight, based on 100 parts by weight of the thermoplastic resin composition.

A method of preparing the weather-resistant acrylate resin using the acrylate resin composition as a starting material is not specifically limited. In an embodiment, the weather-resistant acrylate resin may be prepared in the following manner:

First, an acrylate rubber latex, a (meth)acrylic acid alkyl ester compound and an aromatic vinyl compound are emulsion-polymerized in the presence of an activator-free conversion improver, an emulsifier, an oil-soluble initiator and a molecular weight regulator to prepare an acrylate-styrene graft copolymer having a degree of conversion of 97% or higher.

The prepared graft copolymer is in the form of latex, and can be recovered as powder through coagulation, dehydration and drying processes. Herein, for coagulation, a salt such as calcium chloride, magnesium sulfate or aluminum sulfate, or an acidic compound such as sulfuric acid, nitric acid or hydrochloric acid, or a mixture thereof, may be used as a coagulating agent.

Simultaneously with or subsequently to the emulsion polymerization, 20-75 parts by weight of a (meth)acrylic acid alkyl ester compound, 10-50 parts by weight of an aromatic vinyl compound and 0-5 parts by weight of a vinyl cyan compound are subjected to bulk polymerization, solution polymerization or suspension polymerization to prepare an acrylate-styrene non-graft copolymer.

The molecular weight regulator as described above may also be used, and the (meta)acrylic acid alkyl ester compound, the aromatic vinyl compound and the vinyl cyan compound are as described above with respect to the graft copolymer.

If the (meth)acrylic acid alkyl ester compound is used in an amount of less than 20 parts by weight or more than 75 parts by weight based on 100 parts by weight of the sum of the compounds of the non-graft copolymer, there will be a difference in refractive index between the non-graft copolymer and the graft copolymer, resulting in an increase in haze.

The aromatic vinyl compound is preferably used in an amount of 10-50 parts by weight based on 100 parts by weight of the sum of the latex and compounds of the graft copolymer. If the aromatic vinyl compound is used in an amount of less than 10 parts by weight, the viscosity of the reactants will be high and the processability and flowability of the produced product will be poor, and if it is used in an amount of more than 50 parts by weight, the refractive index of the product will increase.

If the vinyl cyan compound is used in an amount of more than 5 parts by weight based on 100 parts by weight of the non-graft copolymer, yellowing will occur and the color of the final product will be poor.

This non-graft copolymer may be contained in an amount of 10-90 wt % based on the total weight of the acrylate resin composition. If the content of the non-graft copolymer is more than 90 wt %, the impact strength of the resulting resin can be reduced, and if the content of the non-graft copolymer is less than 10 wt %, the scratch resistance and toughness of the resulting resin will be poor.

In other words, an acrylate resin can be prepared from an acrylate resin composition obtained by mixing 10-90 wt % of the acrylate-styrene graft copolymer with 90-10 wt % of the acrylate-styrene non-graft copolymer.

Specifically, the composition is uniformly dispersed using a single-screw extruder, a twin-screw extruder or a Banbury mixer. The dispersed composition is passed through a water bath and cut to yield a pellet-type acrylate resin.

This acrylate resin may have a light transmittance of 92% or higher as measured on a 3 mm thick sheet in accordance with ASTM D1003 at room temperature, a haze value of 1.2% or less for a 3 mm thick sheet in accordance with ASTM D1003 at room temperature, a yellow index (YI) of 0.89 or less as measured using a Color Quest II, a thermal stability of 0.36 or less as calculated based on a change in color ($^\Delta E$), and a weather resistance of 2.1 or less as calculated based on a change in color ($^\Delta E$).

EXAMPLES

Hereinafter, preferred examples will be described for a better understanding of the present invention. It is to be understood, however, that these examples are for illustrative purposes only and are not intended to limit the scope of the present invention.

Preparation Example 1

Graft Copolymer 1

As acrylic rubber latex, a polybutylacrylate latex polymer was used, which had a mean particle diameter of 300 nm as measured using a submicron particle sizer (Nicomp 380, PPS (Particle Sizing Systems)), and a gel content of 70%.

To 50 parts by weight of the polybutylacrylate latex polymer, 0.2 parts by weight of sodium oleate, 35 parts by weight of methyl methacrylate, 12 parts by weight of styrene, 3 parts by weight of acrylonitrile, 0.25 parts by weight of t-dodecyl mercaptan, 0.048 parts by weight of sodium pyrophosphate, 0.10 parts by weight of cumene hydroperoxide and 0.1 parts by weight of disodium 2-hydroxy-2-sulfinatoacetate were continuously added, and the mixture was allowed to react at 75° C. for 5 hours.

The degree of conversion was 96.8%.

After reaction, the reaction mixture was heated to 80° C. and allowed to stand at that temperature for 1 hour, and then the reaction was completed. Next, the reaction product was coagulated with an aqueous solution of calcium chloride and washed, thereby obtaining a powdery graft copolymer.

Preparation Example 2

Graft Copolymer 2

The process of Preparation Example 1 was repeated, except that the polybutylacrylate latex polymer had a mean particle size of 150 nm and a gel content of 88%. The degree of conversion was 97.0%.

Preparation Example 3

Graft Copolymer 3

The process of Preparation Example 1 was repeated, except that 0.002 parts by weight of ferrous sulfate and 0.012 parts by weight of sodium ethylenediamine tetraacetate were further added. The degree of conversion was 98.3%.

Preparation Example 4

Graft Copolymer 4

The process of Preparation Example 1 was repeated, except that 0.1 parts by weight of sodium formaldehyde sulfoxylate was used in place of sodium 2-hydroxy-2-sulfinatoacetate. The degree of conversion was 93%.

Preparation Example 5

Graft Copolymer 5

The process of Preparation Example 4 was repeated, except that 0.002 parts by weight of ferrous sulfate and 0.012 parts by weight of sodium ethylenediamine tetraacetate were further added. The degree of conversion was 97.5%.

Preparation Example 6

Non-Graft Copolymer 1

A mixture of 73 parts by weight of methyl methacrylate, parts by weight of styrene, 2 parts by weight of acrylonitrile, 30 parts by weight of toluene as a solvent and 0.15 parts by weight of t-dodecyl mercaptan as a molecular weight regulator was fed continuously into a reactor over an average reaction time of 3 hours and maintained at a reaction temperature of 148° C. The polymer solution discharged from the reactor was heated in a preheating chamber, and unreacted monomers were volatilized in a volatilization chamber.

Next, the reaction product was extruded through a polymer transfer pump extruder at a temperature of 210° C., thereby preparing a pellet-shaped copolymer.

Preparation Example 7

Non-Graft Copolymer 2

The process of Preparation Example 6 was repeated, except that methyl methacrylate was used in an amount of 74 parts by weight, styrene was used in an amount of 26 parts by weight, and acrylonitrile was not used.

Examples 1 to 3 and Comparative Examples 1 to 3

According to the compositions shown in Table 1 below, the graft copolymers of Preparation Examples 1 to 5 were mixed with the non-graft copolymers of Preparation Examples 6 and 7. Then, 0.1 parts by weight of a lubricant and 0.2 parts by weight of an antioxidant were added to 100 parts by weight of each of the copolymer mixtures which were then extruded through a twin-screw extruder at a cylinder temperature of 220° C. to prepare pellets.

TABLE 1

|  | Graft copolymer (Preparation Example No.) | | | | | Non-graft copolymer (Preparation Example No.) | |
|---|---|---|---|---|---|---|---|
|  | 1 | 2 | 3 | 4 | 5 | 6 | 7 |
| Example 1 | 20 |  |  |  |  | 80 |  |
| Example 2 |  | 40 |  |  |  |  | 60 |
| Example 3 |  |  | 20 |  |  | 80 |  |
| Comparative Example 1 |  |  |  | 20 |  | 80 |  |
| Comparative Example 2 |  |  |  |  | 20 | 80 |  |
| Comparative Example 3 |  |  |  |  | 20 | 80 |  |

The pellets were injection-molded, and measured as to haze value, light transmittance, yellow index, thermal stability and weather resistance in the following manner. The results of the measurement are shown in Table 2 below.

Test for Properties

Haze value and light transmittance: the haze value and light transmittance of a 3 mm thick sheet were measured in accordance with ASTM D-1003.

Yellow index (YI): the YI value (b value) of a 3 mm thick sheet was measured using a Color Quest II. For reference, a higher YI value indicates a color closer to yellow, and a YI value closer to 0 indicates a color closer to natural color.

Thermal stability: for a sample obtained by storing pellets in an oven at 80° C. for 3 days and then injection-molding the pellets, the change in color ($^\Delta$E) was calculated using the following equation 1. The change in color ($^\Delta$E) represents the arithmetic mean value of Hunter Lab values before and after the thermal stability test, and it shows that the closer the value is to 0, the better the thermal stability is. L, a and b are color values measured immediately after extrusion, and L', a' and b' are color values measured after 3 days of storage.

$$\Delta E = \sqrt{(L)^2 + (a)^2 + (b)^2} \qquad \text{Equation 1}$$

Weather resistance: the resin was tested using a Weather-o-meter (Ci35A, ATLAS) at 83° C. for 2000 hours with a water spray cycle of 18 min/120 min. For the tested sample, the change in color (LE) was calculated using equation 1 above.

TABLE 2

|  | Haze (%) | Light transmittance (%) | YI | Thermal stability (ΔE) | Weather resistance (ΔE) |
|---|---|---|---|---|---|
| Example 1 | 1.2 | 92.1 | 0.89 | 0.36 | 1.9 |
| Example 2 | 1.1 | 92.7 | 0.83 | 0.31 | 2.1 |
| Example 3 | 0.9 | 93.0 | 0.51 | 0.35 | 1.7 |
| Comparative Example 1 | 1.7 | 91.7 | 1.61 | 0.75 | 2.5 |
| Comparative Example 2 | 1.3 | 92.1 | 4.06 | 4.01 | 4.9 |
| Comparative Example 3 | 1.4 | 92.1 | 1.84 | 0.81 | 2.0 |

As can be seen in Table 2 above, the resins of Examples 1 to 3 of the present invention had low haze values and yellow index (YI) values, indicating that the color of the resins is close to natural color. Furthermore, the resins had excellent thermal stability, because they contained no Fe ions. However, the resins of Comparative Examples 1 to 3 had high YI values and poor thermal stability due to the use of Fe ions. In addition, in the case of Comparative Example 2 in which Fe ions were used and SFS was used alone, the haze value and light transmittance of the resin were high, but the content of residual monomers increased due to a low degree of conversion while the YI value, thermal stability and weather resistance of the resin were all poor.

What is claimed is:

1. A method of preparing a weather-resistant acrylate resin using an acrylate resin composition as a starting material, wherein the acrylate resin composition comprises an acrylate-styrene graft copolymer and an acrylate-styrene non-graft copolymer, wherein the acrylate-styrene graft copolymer is polymerized comprising an acrylate rubber latex, a (meth)acrylic acid alkyl ester compound, an aromatic vinyl compound, and an activator-free conversion improver, wherein the activator-free conversion improver is one or more selected from among 2-hydroxy-2-sulfinatoacetic acid, disodium 2-hydroxy-2-sulfinatoacetate, and 2-hydroxy-2-sulfinatoacetate, wherein the acrylate resin composition comprises 10-90 wt % of the acrylate-styrene graft copolymer and 90-10 wt % of the acrylate-styrene non-graft copolymer, and wherein the graft copolymer comprises 5-50 parts by weight of the acrylate rubber latex, 20-75 parts by weight of the (meth)acrylic acid alkyl ester compound, 10-50 parts by weight of the aromatic vinyl compound, and 0-5 parts by weight of a vinyl cyan compound.

2. The method of claim 1, wherein the activator-free conversion improver is used in an amount of 0.01-0.5 parts by weight based on 100 parts by weight of the sum of the rubber latex and compounds of the copolymer.

3. The method of claim 1, wherein the acrylate rubber latex has a gel content of 60-90% and a mean particle size of 100-800 nm.

4. The method of claim 1, wherein the graft copolymer is polymerized comprising one or more emulsifiers selected from the group consisting of sulfoethyl methacrylate, 2-acrylamido-2-methylpropane sulfonic acid, sodium styrene sulfonate, sodium dodecyl allyl sulfosuccinate, a styrene-sodium dodecyl allyl sulfosuccinate copolymer, polyoxyethylene alkyl phenyl ether ammonium sulfate, alkenyl $C_{16-18}$ succinic acid di-potassium salt, and sodium methallyl sulfonate, and non-reactive emulsifiers, comprising alkyl aryl sulfonate, sulfonated alkyl ester, soap of fatty acid, and an alkali salt of rosin acid, in an amount of 0.1-5 parts by weight based on 100 parts by weight of the sum of the latex and compounds of the graft copolymer.

5. The method of claim 1, wherein the graft copolymer is polymerized comprising one or more oil-soluble initiators selected from among diisopropylbenzene hydroperoxide, t-hexyl hydroperoxide, 1,1,3,3-tetramethylbutyl hydroperoxide, dicumyl peroxide, t-butylcumyl peroxide, methyl ethyl ketone peroxide, methyl isobutyl ketone peroxide, cyclohexanone peroxide, cumene hydroperoxide, t-butyl hydroperoxide, benzoyl peroxide, lauroyl peroxide, 1,1-di(t-butylperoxy)cyclohexane, 1,1-di(t-butylperoxy)3,3,5-trimethylcyclohexane, t-butylperoxy benzoate, t-butylperoxy 2-ethyl hexanoate, and bis(4-t-butylcyclohexyl) peroxydicarbonate, in an amount of 0.1-5 parts by weight based on 100 parts by weight of the sum of the latex and compounds of the graft copolymer.

6. The method of claim 1, wherein each of the graft copolymer and the non-graft copolymer is polymerized comprising a mercaptan molecular weight regulator in an amount of 0.1-5 parts by weight based on 100 parts by weight of the sum of the latex and compounds of the graft copolymer.

7. The method of claim 1, wherein the acrylate-styrene non-graft copolymer is a bulk polymer, a solution polymer or a suspension polymer, which is polymerized comprising 20-75 parts by weight of the (meth)acrylic acid alkyl ester compound, 10-50 parts by weight of the aromatic vinyl compound, and 0-10 parts by weight of a vinyl cyan compound.

8. The method of claim 1, wherein the (meth)acrylic acid alkyl ester compound is one or more selected from among (meth)acrylic acid methyl ester, (meth)acrylic acid ethyl ester, (meth)acrylic acid propyl ester, (meth)acrylic acid 2-ethylhexyl ester, (meth)acrylic acid decyl ester, and (meth)acrylic acid lauryl ester.

9. The method of claim 1, wherein the aromatic vinyl compound is one or more selected from among styrene, α-methyl styrene, p-methyl styrene, and vinyl toluene.

10. The method of claim 1, wherein the vinyl cyan compound is one or more selected from among acrylonitrile, methacrylonitrile and ethacrylonitrile.

11. The method of claim 1, wherein the composition further comprises one or more selected from among a lubricant, an antioxidant, an antistatic agent, a release agent and a UV stabilizer.

12. The method of claim 1, comprising the steps of:
emulsion-polymerizing the acrylate rubber latex, the (meth)acrylic acid alkyl ester compound and the aromatic vinyl compound in the presence of the activator-free conversion improver, an emulsifier, an oil-soluble initiator and a molecular weight regulator to prepare an acrylate-styrene graft copolymer having a degree of conversion of 97% or higher;
subjecting 20-75 parts by weight of the (meth)acrylic acid alkyl ester compound, 10-50 parts by weight of the aromatic vinyl compound and 0-10 parts by weight of a vinyl cyan compound bulk polymerization, solution polymerization or suspension polymerization to prepare an acrylate-styrene non-graft copolymer having a degree of conversion of 97% or higher; and
melt-mixing 10-90 wt % of the acrylate-styrene graft copolymer with 90-10 wt % of the acrylate-styrene non-graft copolymer, and extruding or injecting the melt-mixed copolymer, thereby preparing a thermoplastic resin.

13. A weather-resistant acrylate resin which is prepared by the method of claim 12 and has a light transmittance of 92% or higher as measured on a 3 mm thick sheet in accordance with ASTM D 1003 at room temperature, a haze value of 1.2 or less on a 3 mm thick sheet in accordance with ASTM D1003 at room temperature, a yellow index (YI) of 0.89 or less as measured using a Color Quest II, a thermal stability of 0.36 or less as calculated based on a change in color ($\Delta E$), and a weather resistance of 2.1 or less as calculated based on a change in color ($\Delta E$).

14. The method of claim 7, wherein the (meth)acrylic acid alkyl ester compound is one or more selected from among (meth)acrylic acid methyl ester, (meth)acrylic acid ethyl ester, (meth)acrylic acid propyl ester, (meth)acrylic acid 2-ethylhexyl ester, (meth)acrylic acid decyl ester, and (meth)acrylic acid lauryl ester.

15. The method of claim 7, wherein the aromatic vinyl compound is one or more selected from among styrene, α-methyl styrene, p-methyl styrene, and vinyl toluene.

16. The method of claim 7, wherein the vinyl cyan compound is one or more selected from among acrylonitrile, methacrylonitrile and ethacrylonitrile.

17. A method of preparing a weather-resistant acrylate resin using an acrylate resin composition as a starting material, wherein the acrylate resin composition comprises an acrylate-styrene graft copolymer and an acrylate-styrene non-graft copolymer, wherein the acrylate-styrene graft copolymer is polymerized comprising an acrylate rubber latex, a (meth)acrylic acid alkyl ester compound, an aromatic vinyl compound, and an activator-free conversion improver,
wherein the activator-free conversion improver is one or more selected from among 2-hydroxy-2-sulfinatoacetic acid, disodium 2-hydroxy-2-sulfinatoacetate, and 2-hydroxy-2-sulfinatoacetate,
wherein the acrylate resin composition comprises 10-90 wt % of the acrylate-styrene graft copolymer and 90-10 wt % of the acrylate-styrene non-graft copolymer, and
wherein the acrylate-styrene non-graft copolymer is a bulk polymer, a solution polymer or a suspension polymer, which is polymerized comprising 20-75 parts by weight of the (meth)acrylic acid alkyl ester compound, 10-50 parts by weight of the aromatic vinyl compound, and 0-10 parts by weight of a vinyl cyan compound.

* * * * *